United States Patent [19]

Inaguma et al.

[11] Patent Number: 5,258,440
[45] Date of Patent: Nov. 2, 1993

[54] RESIN COMPOSITIONS OF HIGH HEAT RESISTANCE

[75] Inventors: Yoshiyuki Inaguma, Yamato; Ken Kashiwadate; Yoshikatsu Satake, both of Iwaki, all of Japan

[73] Assignee: Kureha Kagaku Kogyo K. K., Japan

[21] Appl. No.: 876,261

[22] Filed: Apr. 30, 1992

[30] Foreign Application Priority Data

May 10, 1991 [JP]  Japan ................................. 3-135502

[51] Int. Cl.5 ............................................. C08K 3/00
[52] U.S. Cl. .................................. 524/424; 525/537; 528/226
[58] Field of Search ................ 524/424, 436; 528/226; 525/537

[56] References Cited

U.S. PATENT DOCUMENTS

| | | | |
|---|---|---|---|
| 3,919,177 | 11/1975 | Campbell | 260/79.1 |
| 4,792,481 | 12/1988 | O'Connor et al. | 428/288 |
| 4,795,479 | 1/1989 | Karol | 44/63 |
| 4,812,552 | 3/1989 | Cliffton et al. | 528/226 |
| 4,886,871 | 12/1989 | Satake et al. | 528/226 |
| 4,916,179 | 4/1990 | Vires | 524/421 |
| 4,960,806 | 10/1990 | Satake et al. | 524/100 |
| 4,962,143 | 10/1990 | Satake et al. | 524/100 |
| 5,120,808 | 6/1992 | Satake et al. | 525/537 |

FOREIGN PATENT DOCUMENTS

| | | |
|---|---|---|
| 60-58435 | 4/1985 | Japan. |
| 60-104126 | 6/1985 | Japan. |
| 60-120720 | 6/1985 | Japan. |
| 61-197634 | 9/1986 | Japan. |
| 61-200127 | 9/1986 | Japan. |
| 62-27434 | 2/1987 | Japan. |
| 64-124 | 1/1989 | Japan. |
| 3-67554 | 3/1991 | Japan. |
| 3-203929 | 9/1991 | Japan. |
| 3-223332 | 10/1991 | Japan. |

*Primary Examiner*—Paul R. Michl
*Assistant Examiner*—La Vonda Delvitt
*Attorney, Agent, or Firm*—Lowe, Price, LeBlanc & Becker

[57] ABSTRACT

Disclosed herein is a resin composition of high heat resistance, comprising 100 parts by weight of at least one arylene thioether ketone polymer and 0.05–30 parts by weight of strontium carbonate.

16 Claims, No Drawings

RESIN COMPOSITIONS OF HIGH HEAT RESISTANCE

FIELD OF THE INVENTION

This invention relates to compositions of an arylene thioether ketone polymer, and more specifically to heat-resistant compositions of an arylene thioether ketone polymer, which have excellent melt stability and easy crystallizability.

BACKGROUND OF THE INVENTION

In recent years, there has been a strong demand for thermoplastic resins having high heat resistance and permitting easy melt processing in the fields of the electronic and electrical industry and the automobile, aircraft and space industries. As polymers satisfying such a requirement, there have been proposed various kinds of arylene thioether ketone polymers containing both aromatic ketone units and aromatic thioether units in their polymer skeletons. For example, polymers having the following structural formula [I], [II], [III] or [IV] are known (Japanese Patent Application Laid-Open Nos. 58435/1985, 124/1989, 200127/1986, 197634/1986 and 27434/1987):

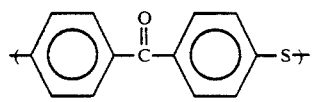  [I]

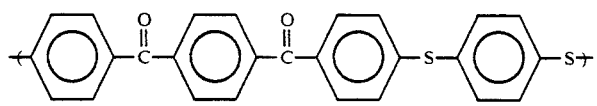  [II]

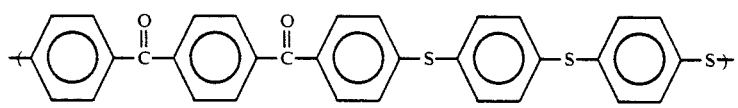  [III]

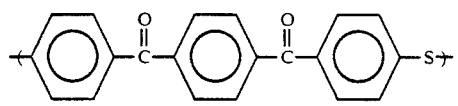  [IV]

These arylene thioether ketone polymers (hereinafter abbreviated as "PATK"s) have a high melting point and hence involve a drawback that their melt processing temperatures are high accordingly, so that they tend to loss their crystallinity or to undergo crosslinking and/or carbonization, resulting in a rapid increase in melt viscosity, upon their melt processing.

In order to improve the above drawback, it is disclosed in U.S. Pat. No. 4,812,552 to bring a poly(arylene sulfide-ketone) into contact with calcium cations, and U.S. Pat. No. 4,792,481 discloses prepregs formed of a high-molecular weight poly(arylene sulfide-ketone) resin containing a certain amount of calcium therein.

It was however found from the experiments of the present inventors that calcium ions have an effect to improve the melt stability of the poly(arylene sulfide-ketone), but strongly interact on the poly(arylene sulfide-ketone), so that its crystallization speed and degree of crystallinity are lowered. Therefore, molded or formed products from such a resin become slow in their solidification upon injection molding or the like, and hence its molding or forming cycle cannot but require a lot of time, leading to inefficient production. The resin also has a great drawback from the viewpoint of practical use that its physical properties such as heat resistance are impaired.

It is disclosed in U.S. Pat. No. 4,795,479 to add a basic compound typified by the hydroxide or oxide of a Group IIA metal of the periodic table to a block copolymer containing at least one arylene sulfide-ketone block so as to improve the melt stability of the copolymer. However, this process also involves the foregoing problems.

On the other hand, for example, poly(p-phenylene thioether) as a poly(arylene thioether) (hereinafter abbreviated as "PATE") is used as a high-performance engineering plastic having excellent heat resistance and solvent resistance. PATE is obtained by reacting dichlorobenzene, which is a monomer very cheap and industrially available, with sodium sulfide (U.S. Pat. No. 3,919,177). However, its crystalline melting point is about 285° C. and its glass transition point (Tg) is also as low as about 85° C. There is thus a demand for development of polymers having a higher melting point and a higher Tg.

In order to solve the above problems, it has also been proposed to react an aromatic thioether with phosgene or an aromatic dicarboxylic acid dihalide in the presence of a Lewis acid in an aprotic solvent, thereby obtaining polymers having respective predominant recurring units of the following structural formulae [V] and [VI] (Japanese Patent Application Laid-Open Nos. 104126/1985 and 120720/1985):

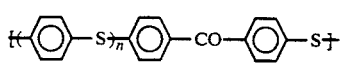  [V]

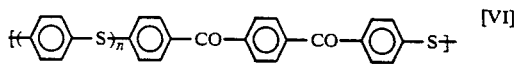  [VI]

However, the resulting polymers have a low degree of polymerization and poor melt stability.

OBJECTS AND SUMMARY OF THE INVENTION

An object of this invention is to provide resin compositions having high melt stability and easy crystallizability and improved in degree of crystallinity while retaining the excellent properties, such as heat resistance and crystallinity, of the aforementioned PATK as much as possible.

The present inventors have carried out an extensive investigation. As a result, it has been found that when strontium carbonate is added to PATK, a PATK composition improved in melt stability can be obtained without lowering its crystallization speed and degree of crystallinity.

This composition has excellent melt stability and easy crystallizability, is improved in degree of crystallinity and the like, and solved in problems of sticking of thermal decomposition products to resin residence areas of melt processing equipment, and the like as compared to the PATK alone or PATK brought into contact with calcium ions.

The present invention has been brought to completion on the basis of this finding.

According to the present invention, there is thus provided a resin composition of high heat resistance, comprising 100 parts by weight of at least one arylene thioether ketone polymer and 0.05-30 parts by weight of strontium carbonate.

DETAILED DESCRIPTION OF THE INVENTION

Arylene Thioether Ketone Polymer (PATK)

The PATKs useful in the practice of this invention are homopolymers and copolymers (including random, alternating block and graft copolymers), which contain both aromatic ketone units and aromatic thioether units in their polymer skeletons.

Preferred PATKs may contain ketone units in a range of 1-30 wt. %, preferably 2-20 wt. %. The PATKs may preferably be crystalline polymers having a melting point, Tm ranging from about 280° to 450° C., preferably from 285° to 400° C. and also a melt viscosity of 2-100,000 poises, preferably 5-50,000 poises as measured in a temperature range of from (Tm +10° C.) to (Tm +100° C.) at a shear rate of 1,200/sec.

As specific examples of such PATKs, may be mentioned the following polymers:

(1) poly(arylene thioether-ketones) (U.S. Pat. No. 4,886,871);

(2) poly(arylene thioether ketone ketones) (Japanese Patent Application Laid-Open No. 203929/1991);

(3) poly(arylene thioether) block copolymers containing poly(arylene thioether-ketone) blocks and poly(arylene thioether) blocks (Japanese Patent Application Laid Open No. 225527/1990, and U.S. Pat. Nos. 4,962,143 and 4,960,806);

(4) poly(arylene thioether) copolymers containing poly(arylene thioether-ketone) segments and poly(arylene thioether) segments (Japanese Patent Application No. 67554/1991);

(5) block copolymers containing poly(arylene thioether ketone ketone) blocks and poly(arylene thioether) blocks (Japanese Patent Application No. 320810/1990); and the like. Besides, the polymers represented by the general formulae (II), (III), (V) and (VI) described above may be used. These PATKs may be used either singly or in combination.

As an exemplary PATK of this kind, may be mentioned a copolymer alternately comprising at least one poly(arylene thioether-ketone) component [hereinafter abbreviated as "PTK component (X)" or simply "(X)"] having predominant recurring units of the formula:

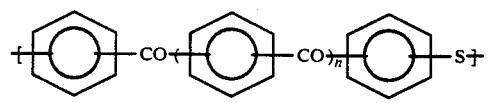

wherein n stands for 0 or 1, and at least one poly(arylene thioether) component [hereinafter abbreviated as "PATE component (Y)" or simply "(Y)"] having predominant recurring units of the formula:

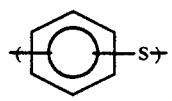

This copolymer will hereinafter be described in detail.

(1) Chemical structure

The components (X) and (Y) contain respectively the above-described recurring units in proportions of at least 50 wt. %, preferably at least 70 wt. %, more preferably at least 80 wt. %.

Among these recurring units, recurring units of the formulae:

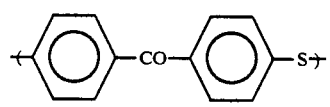

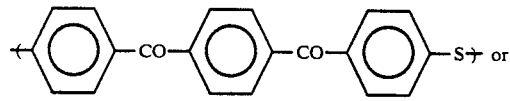

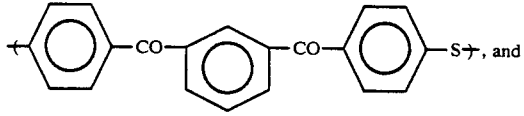

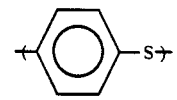

are preferred as recurring units of the PTK component (X) and the PATE component (Y), respectively, because they can afford copolymers especially excellent from the viewpoint of crystallinity, melt stability, heat resistance, mechanical properties, solvent resistance, moisture absorption resistance and the like.

The copolymer can have a desired structure containing both components in an alternate order, such as $(X)—(Y)—(X)_m(Y)—(X)$, m being 0 or an integer of 1 or greater or $(X)—(Y)—(X)_n(Y)$, n being 0 or an integer of 1 or greater.

The PTK component (X) serves to impart high degree of heat resistance and crystallinity to the copolymer. On the other hand, the PATE component (Y) contributes to the reduction of the processing temperature while maintaining the high crystallinity. Therefore, the weight ratio of the total amount of the components (Y) to the total amount of the components (X) is generally within a range of 0.05-9 though it varies according to the recurring units constituting (X).

In particular, when the PTK component (X) has predominant recurring units of the formula:

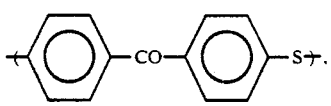

the weight ratio is preferably within a range of 0.05–5, more preferably 0.1–4, most preferably 0.15–3.

When the PTK component (X) has predominant recurring units of the formula:

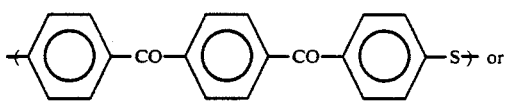 or

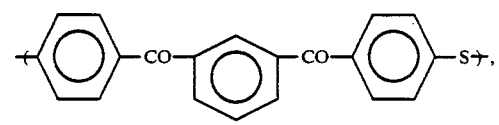

the weight ratio is preferably within a range of 0.1–9, more preferably 0.3–5, most preferably 0.35–4.

The PATE component (Y) preferably has a weight-average molecular weight of 200 or higher, more preferably 300 or higher, most preferably 400 or higher.

Incidentally, the weight-average molecular weight of the PATE component (Y) is determined by gel permeation chromatography (GPC) at a stage of the PATE prepolymer.

Measuring conditions are as follows:
Column: SHODEX AT 80 M/S, two columns in series
Solvent: α-chloronaphthalene
Flow rate: 0.7 ml/min
Temperature: 220° C.
Sample concentration: 0.05 wt. %
Charged amount: 200 μl
Detector: flame ionization detector (FID)
Calibration of molecular weight: standard polystyrene and

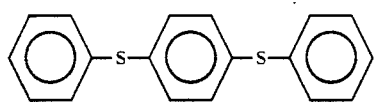

Data processing: C-R4AX (manufactured by Shimadzu Corporation)

The PTK component (X) and PATE component (Y) have respectively the above-described predominant recurring units (at least 50 wt. %, preferably at least 70 wt. %, more preferably at least 80 wt. %), but may contain one or more recurring units other than the predominant recurring units to an extent that the object of the present invention is not impaired. In general, these other recurring units can be introduced into the copolymers by using the corresponding various dihalogenated aromatic compounds as comonomers.

(2) Crystallinity

Crystallinity imparts high heat resistance to a copolymer. To have a copolymer equipped with high heat resistance, it is essential that the copolymer has sufficient crystallinity.

In general, melt crystallization enthalpy, ΔHmc is proportional to the degree of crystallization when a molten polymer undergoes crystallization. On the other hand, melt crystallization temperature, Tmc serves as an index of the readiness of crystallization. Therefore, the melt crystallization enthalpy, ΔHmc (400° C.) and melt crystallization temperature, Tmc (400° C.) of a polymer as measured at a cooling rate of 10° C./min immediately after the polymer is heated to 400° C. in an inert gas atmosphere by means of a differential scanning calorimeter (hereinafter abbreviated as "DSC") can be used as indices of the crystallinity of the polymer.

In addition, residual melt crystallization enthalpy, ΔHmc (400° C./10 min) and melt crystallization temperature, Tmc (400° C./10 min) measurable upon determination of the residual crystallinity, both of which will be described subsequently, can be used as an index of not only melt stability but also crystallinity.

The copolymers suitable of use in this invention may preferably have ΔHmc (400° C.) of at least 10 J/g, more preferably at least 15 J/g, most preferably at least 20 J/g. On the other hand, Tmc (400° C.) may desirably be at least 170° C., with at least 180° C. being more preferred.

(3) Melt stability

A feature of the copolymers suitable for use in this invention resides in that they have melt stability successfully improved to an extent sufficient to permit the application of conventional melt processing techniques by incorporating strontium carbonate as a stabilizer therein. Polymers of poor melt stability tend to lose their crystallinity or to undergo curing or decomposition, resulting in a rapid increase in melt viscosity, upon melt processing even when strontium carbonate is incorporated therein.

It is hence possible to obtain an index of the melt stability of a polymer by investigating the residual crystallinity of the polymer after holding it at an elevated temperature of its melt processing temperature or higher for a predetermined period of time. The residual crystallinity can be evaluated quantitatively by measuring the melt crystallization enthalpy of the polymer by a DSC.

Specifically, it is possible to use, as measures of the melt stability of a polymer, its residual melt crystallization enthalpy, ΔHmc (400° C./10 min) and melt crystallization temperature, Tmc (400° C./10 min), which are determined at a cooling rate of 10° C./min after the polymer is held at 50° C. for 5 minutes in an inert gas atmosphere, heated to 400° C. at a rate of 75° C./min and then held for 10 minutes at 400° C. (an elevated temperature of its melt processing temperature or higher). In the case of a polymer having poor melt stability, it undergoes crosslinking or the like under the above conditions, namely, when it is held for 10 minutes at the high temperature of 400° C., whereby the polymer loses its crystallinity substantially.

The copolymers suitable for use in this invention are polymers having physical properties that their ΔHmc (400° C./10 min) are at least 5 J/g, more preferably at least 10 J/g, most preferably at least 15 J/g and their Tmc (400° C./10 min) are at least 160° C., more preferably at least 170° C., most preferably at least 180° C.

Further, the ratio of melt crystallization enthalpy to residual melt crystallization enthalpy, namely, ΔHmc (400° C.)/ΔHmc (400° C./10 min) can also be used as an index of the melt stability. Deterioration by heat becomes smaller as this ratio decreases. Therefore, it is preferable that ΔHmc (400° C./10 min) is at least 5 J/g and the above ratio is 5 or smaller, more preferably 3 or smaller.

(4) Melt viscosity

In this invention, the melt viscosity of each copolymer is used as an index of its molecular weight. Specifically, a polymer sample is filled in a Capirograph (manufactured by Toyo Seiki Seisaku-Sho, Ltd.) equipped with a nozzle having an inner diameter of 1 mm and an L/D ratio of 10/1 and is preheated at 370° C. for 5 minutes. Its melt viscosity, $\eta*_5$ is measured at a shear rate of 1,200/sec.

The copolymers suitable for use in the present invention may preferably have a melt viscosity, $\eta*_5$ of 2-100,000 poises, preferably 5-50,000 poises, more preferably 10-30,000 poises.

(5) Production Process of Copolymers

A variety of processes may be contemplated for the production of the copolymers, for example, including:

(1) a dihalogenated aromatic compound consisting principally of a dihalobenzophenone and/or bis(-halobenzoyl)benzene is added to and reacted with a PATE component (Y) which has been prepared in advance, whereby a PTK component (X) is formed to prepare a copolymer;

(2) a dihalogenated aromatic compound consisting principally of a dihalobenzene is added to and reacted with a PTK component (X) which has been prepared in advance, whereby a PATE component (Y) is formed to prepare a copolymer;

(3) a PTK component (X) and a PATE component (Y), which have been prepared separately, are chemically combined together; and (4) a PATE is reacted with an alkali metal sulfide, and a dihalogenated aromatic compound is then added to react them, thereby preparing a copolymer.

For the preparation of the PATE component, for the reaction in which the PTK component is formed in the presence of the PATE component to form a copolymer, for the preparation of the PTK component and for the reaction in which the PTK component and PATE component are combined together to synthesize a copolymer, it is necessary to conduct the reaction under special conditions, namely by causing water to exist in specific amounts in the reaction systems, controlling the monomer compositions suitably, regulating the polymerization temperatures appropriately, and limiting reaction time at high temperatures to specific short periods of time. It is effective for the production of copolymers having more preferable physical properties, for example, to choose a suitable material for the reactor and to apply stabilization treatment in the final stage of the reaction. As such production processes, may be adopted the processes described in Japanese Patent Application Laid-Open No. 225527/1990 and Japanese Patent Application Nos. 320810/1990, 67550/1991, 67554/1991 and 67609/1991.

Another preferred PATKs are poly(arylene thioether ketones) (hereinafter abbreviated as "PTK") having predominant recurring units of the formula:

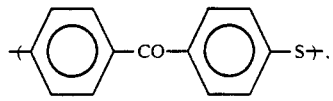

wherein the —CO— and —S— are in the para position to each other.

In order to be heat-resistant polymers, the PTKs employed in this invention may preferably contain the above-described recurring units in a proportion of at least 50 wt. %, preferably at least 60 wt. %, more preferably at least 70 wt. %.

The PTKs used in this invention may preferably have the following physical properties.

(a) As indices of their excellent heat resistance, their melting points, Tm range from 310°-380° C.

(b) As indices of the melt stability sufficient to permit application of conventional melt processing techniques, their residual melt crystallization enthalpies, ΔHmc (400° C./10 min) are at least 10 J/g, and their melt crystallization peak-temperatures, Tmc (400° C./10 min) are at least 210° C.

(c) As indices of the molecular weights of the polymers, their melt viscosities are 2-100,000 poises (at 370° C.).

PTKs having such properties can suitably be prepared in accordance with the process described in U.S. Pat. No. 4,886,871.

The above-described PATKs useful in the practice of this invention are desirably uncured polymers, especially, uncured linear polymers. However, PATKs having a partially crosslinked and/or branched structure to such an extent still allowing the application of conventional melt processing techniques are also acceptable as PATKs usable in the present invention. For example, PATKs obtained by conducting polymerization in the presence of a small amount of a crosslinking agent and PATKs subjected to mild curing are acceptable as PATKs usable in this invention.

Strontium Carbonate

The addition of strontium carbonate as a stabilizer to the composition according to this invention can reduce or prevent the melt viscosity increase or decrease of degree of crystallinity and crystallization speed due to thermal modification and/or thermal deterioration, the sticking of thermal decomposition products at resin residence areas of melt processing equipment, etc. upon melt processing of the composition.

The proportion of strontium carbonate in the composition of this invention is within a range of 0.05-30 parts by weight, preferably 0.1-10 parts by weight, more preferably 0.1-5 parts by weight per 100 parts by weight of the PATK. If the proportion of the stabilizer is smaller than 0.05 part by weight, its stabilizing effect is insufficient. To the contrary, any proportions greater than 30 parts by weight involve a potential problem that the physical properties of the PATK may be lowered and its electrical properties or the like may be deteriorated.

Other Components

The heat-resistant resin compositions according to this invention may contain, if desired, at least one of other thermoplastic resins and/or various kinds of additives such as fillers.

Each composition of this invention may be mixed with at least one of other thermoplastic resins compatible with PATK in a proportion of 0-400 parts by weight, preferably 0-200 parts by weight, more preferably 0-100 parts by weight per 100 parts by weight of the PATK, if desired.

If the proportion of the other thermoplastic resin exceeds 400 parts by weight, there is a potential problem that the advantageous properties of the PATK, heat-resistant and crystalline thermoplastic resin, could be impaired substantially in the resulting resin composition.

As other thermoplastic resins useful in the practice of this invention, may be used those known per se in the art and mentioned, for example, poly(arylene thioethers) (PATEs), aromatic polyether ketones such as polyether ether ketones (PEEKs) and polyether ketones (PEKs), polyamides (including Aramids), polyesters (including aromatic polyesters and liquid crystalline polyesters), aromatic polysulfones such as polysulfones and polyether sulfones, polyether imides, poly(phenylene ethers), and the like.

Among the above-exemplified thermoplastic resins, PATEs, especially, PATEs having predominant recurring units of the formula:

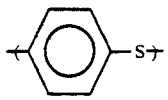

(said recurring units accounting for at least 50 wt. %) exhibit excellent compatibility when mixed with the PATK, and also have a great feature that a composition containing such a resin can provide transparent molded or formed products in an amorphous state when the composition contains neither fibrous nor inorganic fillers.

The heat-resistant resin compositions according to this invention may contain, if desired, at least one of fibrous and/or at least one of inorganic fillers in a proportion of 0–400 parts by weight, preferably 0–300 parts by weight, more preferably 0–200 parts by weight per 100 parts by weight of the sum of resin components (the PATK alone or the sum of the PATK and the other thermoplastic resins). If the proportion of these fillers exceeds 400 parts by weight, there is a potential problem that the processability may be reduced significantly. Such a large proportion is therefore not preferred.

As fibrous fillers and/or inorganic fillers useful in the practice of this invention, may be used widely those known per se in the art. As exemplary fibrous fillers, may be mentioned glass fibers, carbon fibers, Aramid fibers and the like. As exemplary inorganic fillers, may be mentioned talc, mica, silica, titanium oxide, calcium carbonate, iron oxides, ferrite and the like.

The heat-resistant resin compositions according to this invention may also be added with additives such as an antioxidant, light stabilizer, rust inhibitor, lubricant, viscosity modifier, surface-roughening agent, nucleating agent, mold-releasing agent, colorant, coupling agent, flashing preventive and/or antistatic agent as needed.

The antioxidants include radical chain terminators, peroxide decomposers and the like. As specific examples of the antioxidants, may be mentioned hindered phenolic compounds, phosphorus compounds and hindered amine compounds.

The antioxidants may be preferably low volatile and hardly decomposable. In particular, the phosphorus compounds may preferably used. The antioxidants may be used either singly or in combination. When the antioxidants are used in combination with each other, the combination of the radical chain terminator and the peroxide decomposer is preferred.

The antioxidant may be used in a proportion of 0–10 parts by weight, preferably 0.05–5 parts by weight, more preferably 0.1–3 parts by weight per 100 parts by weight of the PATK.

Besides, a zinc compound such as zinc oxide or zinc carbonate may preferably be used as a scavenger for corrosive gases.

Properties of Heat-Resistant Resin Compositions (1) Melt stability

A great feature of the compositions according to this invention resides in its excellent melt stability. The extent of a variation of the melt viscosity of a polymer at its melt processing temperature can be used as an index of the improving effect on its melt stability.

When a polymer is maintained at a high temperature, it is generally observed that its melt viscosity decreases or on the contrary, increases due to decomposition or a crosslinking reaction or the like. When a conventional melt processing technique is applied, it is highly desired that the variation of the melt viscosity is small.

Variations in melt viscosity will be expressed by a ratio $\eta^*_{30}/\eta^*_5$ in which $\eta^*_5$ is a melt viscosity (shear rate: 1200/sec) of a composition as measured by a Capirograph (manufactured by Toyo Seiki Seisaku-Sho, Ltd.) after the composition is held at 370° C. for 5 minutes and $\eta^*_{30}$ is a melt viscosity (shear rate: 1200/sec) of the composition as measured by the Capirograph after the composition is held at 370° C. for 30 minutes.

The compositions according to this invention may preferably have $\eta^*_{30}/\eta^*_5$ of 0.5–15, more preferably 0.6–10, most preferably 0.7–9.

If $\eta^*_{30}/\eta^*_5$ is greater than 15 or smaller than 0.5, the improving effects on melt stability are dissatisfactory so that the prolongation of the long-run time of melt processing cannot be expected too much.

The improving effects on melt stability can also be evaluated by the degrees of increase of residual melt crystallization enthalpy, ΔHmc and melt crystallization temperature, Tmc.

Specifically, the improving effects are represented by the degrees of increase expressed in terms of differences, i.e., Δ[ΔHmc (400° C./10 min)] and Δ[Tmc (400° C./10 min)], between ΔHmc (400° C./10 min) and Tmc (400° C./10 min) measured as to a composition of this invention and those of the PATK alone free of strontium carbonate as a stabilizer or a composition thereof.

In the compositions according to this invention, the degree of increase of ΔHmc (400° C./10 min) owing to the blending of strontium carbonate, i.e., Δ[ΔHmc (400° C./10 min)] may preferably be at least 5 J, more preferably at least 10 J, most preferably at least 15 J, all, per g of the PATK. Similarly, Δ[Tmc (400° C./10 min)] may preferably be at least 5° C., more preferably at least 7° C., most preferably at least 10° C.

Compositions having Δ[ΔHmc (400° C./10 min)] smaller than 5 J or Δ[Tmc (400° C./10 min)] lower than 5° C. may not have fully-prolonged long-run time upon their melt processing and may not be able to provide molded or formed products having physical properties, such as heat resistance, improved owing to improved degrees of crystallinity.

(2) Crystallinity

The heat-resistant resin compositions according to this invention are those prevented from or reduced in reduction of crystallization speed, and improved in degree of crystallinity. The degree of increase of Tmc (400° C.) owing to the addition of strontium carbonate as a stabilizer, i.e., Δ[Tmc (400° C.)] may preferably be at least 5° C., more preferably at least 7° C., most preferably at least 10° C. Compositions having Δ[Tmc (400° C.)] lower than 5° C. may not be able to provide molded or formed products having physical properties, such as heat resistance, improved owing to improved crystallization speed and may involve a potential problem that molding or forming time may not be sufficiently shortened.

Besides, the degree of increase of ΔHmc (400° C.) owing to the addition of strontium carbonate, i.e., Δ[ΔHmc (400° C.)] may preferably be at least 3 J, more preferably at least 4 J, most preferably at least 5 J, all, per g of the PATK. Compositions having Δ[ΔHmc (400° C.)] smaller than 3 J may not be able to provide molded or formed products having physical properties, such as heat resistance, improved owing to improved degrees of crystallinity.

Incidentally, the composition according to this invention can be prepared by a various kinds of the conventional blending methods such as a dry blending method.

The compositions of this invention can provide various molded or formed products in accordance with conventional melt processing techniques such as extrusion and injection molding. They can also be used as heat-resistant and corrosion-resistant coatings, sizing agents for various kinds of fillers, hot-melt adhesives, sealants, etc. as they are.

ADVANTAGES OF THE INVENTION

The heat-resistant resin compositions according to this invention have the following advantageous effects:

(1) since they are compositions having melt stability sufficient to permit application of conventional melt processing techniques, various kinds of molded or formed products such as extruded or injection-molded products, which have high heat resistance and practical mechanical properties, or coatings, sizing agents, adhesives, sealants, etc. can be provided from these compositions as raw materials at economical cost;

(2) since they are compositions improved in decrease of degree of crystallinity and crystallization speed, melt viscosity variation and the like, which take place due to thermal modification and/or thermal deterioration upon melt processing, it becomes feasible to prolong the long-run time of melt processing considerably and to shorten the molding cycle time of injection molding, thereby making it possible to achieve a significant reduction in the cost of melt processing;

(3) since the degree of crystallinity of a melt-molded or formed product is increased, it becomes feasible to improve significantly physical properties of the resulting molded or formed product, such as heat resistance and mechanical properties; and (4) the sticking of thermal decomposition products to surfaces of a melt processing equipment, where the equipment is brought into contact with the molten resin, is reduced, whereby the cleaning of a processing equipment is rendered easy.

EMBODIMENTS OF THE INVENTION

The present invention will hereinafter be described in further detail by the following Examples, Experiments and Comparative Examples. It should however be borne in mind that the present invention is not limited only to the following Examples.

SYNTHESIS EXPERIMENT 1

(Synthesis of Copolymer $C_1$

Synthesis of PATE Prepolymer

First Step

A titanium-lined reactor was charged with 165.0 kg of hydrated sodium sulfide (water content: 53.91 wt. %) and 350 kg of N-methylpyrrolidone (hereinafter abbreviated as "NMP"). While gradually heating the contents to 185° C. in a nitrogen gas atmosphere, 65.6 kg of water and 29.6 moles of hydrogen sulfide were distilled off. Thereafter, 104.2 kg of p-dichlorobenzene (hereinafter abbreviated as "PDCB"), 2.4 kg of water and 122.5 kg of NMP were fed (PDCB/sodium sulfide =0.75 mole/mole; water content/NMP =3 moles/kg), followed by polymerization at 220° C. for 4 hours and further at 230° C. for 4 hours.

A portion of a reaction mixture (Slurry $S_1$) in the form of a slurry was sampled out to determine the amount of the remaining monomer and the weight-average molecular weight of the resulting Prepolymer $P_1$. The amount of PDCB (remaining monomer) in Slurry $S_1$ as determined by gas chromatography was less than 0.1 wt. % of the charged amount. The weight-average molecular weight of Prepolymer $P_1$ was 1,200.

The weight-average molecular weight was determined by preparing a sample in the following manner and subjecting it to high-temperature GPC.

Immediately after completion of the reaction of the prepolymer, a portion of the reaction mixture in the form of a slurry was sampled out and then poured into water, and its pH was adjusted to 3.0 with hydrochloric acid to have the prepolymer precipitated. The prepolymer was collected by filtration, thoroughly washed in distilled water and then dried under reduced pressure at room temperature in a vacuum drier, thereby obtaining a prepolymer sample. The thus-obtained prepolymer sample was added to α-chloronaphthalene to a concentration of 0.05 wt. % and dissolved therein under heating, thereby preparing a sample solution for GPC. The measuring conditions for high-temperature GPC are as described above.

Synthesis of PTK Prepolymer

Second Step

A titanium-lined reactor was charged with 136.01 kg of 4,4'-dichlorobenzophenone (hereinafter abbreviated as "DCBP"; product of Ihara Chemical Industry Co., Ltd.), 53.86 kg of hydrated sodium sulfide (water content: 53.91 wt. %), 24.7 kg of water and 595.5 kg of NMP (water content/NMP =about 5 moles/kg). After the reactor being purged with nitrogen, the contents were maintained for 1 hour at 220° C. to obtain a reaction mixture (Slurry $KS_1$) in the form of a slurry, which contained PTK Prepolymer $K_1$.

Synthesis of Copolymer

Third Step

Slurry $S_1$ containing PATE Prepolymer $P_1$ (slurry temperature: 180° C.) was added to Slurry $KS_1$ (slurry temperature: 180° C.) containing PTK Prepolymer $K_1$, and 113.3 kg of water was further added to mix them.

After the contents were heated to 274° C., they were immediately cooled to 240° C., followed by addition of 12.7 kg of DCBP and 30 kg of NMP. Thereafter, the reaction mixture was reacted for 30 minutes at 240° C. to conduct the final treatment of the reaction.

The reaction conditions upon the synthesis of a copolymer were as follows:

(1) the molar ratio of the total amount of the charged dihalogenated aromatic compound (the sum of the amount of PDCB charged upon the synthesis of PATE Prepolymer $P_1$ and the amount of DCBP charged upon the synthesis of PTK Prepolymer $K_1$) to the total amount of the charged alkali metal sulfide (the sum of the amount of sodium sulfide charged upon the synthesis of PATE Prepolymer $P_1$ and the amount of sodium sulfide charged upon the synthesis of PTK Prepolymer $K_1$) was 0.99;

(2 the molar ratio of the amount of PDCB charged in the first step to the amount of DCBP charged in the second step was 1.3; and (3) the ratio of the water content to the charged amount of the organic amide (NMP) was 10 moles/kg.

Collection of Copolymer

The resulting reaction mixture in the form of a slurry was filtered through a screen having an opening size of 150 μm (100 mesh) to collect a granular polymer. The thus-obtained granular polymer was washed with an equiamount of NMP and sifted by the above screen to collect it. The polymer was washed twice with methanol and further five times with water in the same manner as described above to obtain the polymer in a wet form. The thus-obtained wet polymer was dried for 4 hours at 140° C. by a paddle dryer to obtain Copolymer $C_1$ in the form of granules (collection rate: about 80%).

Inherent Properties of Copolymer $C_1$

Copolymer $C_1$ was subjected to infrared spectrum analysis (IR). As a result, a strong absorption peak attributed to ketone group was observed at about 1640 $cm^{-1}$. Wide angle X-ray diffraction which was conducted using "RAD-B System" (manufactured by Rigaku Denki Kabushiki Kaisha) showed a diffraction pattern apparently different from that corresponding to a PATE homopolymer, a PTK homopolymer or a blend thereof.

The content of sulfur in Copolymer $C_1$ was determined by means of a sulfur analyzer ("EMIA-510" manufactured by Horiba Ltd.).

The weight fraction $W_b$ (wt. %) of the recurring units

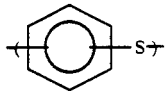

in the copolymer can be calculated in accordance with the following equation and was 40%.

$$W_b = (W - W_1)/(W_2 - W_1) \times 100$$

wherein W means the weight fraction of sulfur in the copolymer, $W_1$ denotes the weight fraction of sulfur in PTK recurring unit, and $W_2$ represents the weight fraction of sulfur in PATE recurring unit. The content of ketone groups in the copolymer was 7.9 wt. %.

Physical Properties of Copolymer $C_1$

The physical properties of Copolymer $C_1$ were as follows:

Melt viscosity: 330 poises
Transition temperature:
  Tg: 117° C. (as to quench-pressed sheet)
  Tm: 322° C. (as to quench-pressed sheet)
Melt crystallization temperature:
  Tmc (400° C.): 267° C.
  Tmc (400° C./10 min): 206° C.
Melt crystallization enthalpy:
  ΔHmc (400° C.): 61 J/g
Residual melt crystallization enthalpy:
  ΔHmc (400° C./10 min): 36 J/g Incidentally, the weight ratio of the sum of arylene thioether components to the sum of arylene thioether ketone components was 0.67.

SYNTHESIS EXPERIMENT 2

Synthesis of Copolymer $C_2$

Synthesis of PATE Prepolymer

First Step

A reaction mixture (Slurry $S_2$) in the form of a slurry, which contained Prepolymer $P_2$, was obtained in the same manner as in Synthesis Experiment 1 except that the amounts of hydrated sodium sulfide and NMP, and PDCB, water and NMP after distilling off were changed to 170.0 kg and 375 kg, and 114.2 kg, 0 kg and 110 kg, respectively (PDCB/sodium sulfide =0.80 mole/mole; water content/NMP =3 moles/kg).

The amount of the remaining PDCB and the weight-average molecular weight of Prepolymer $P_2$ were determined in the same manner as in Synthesis Experiment 1 and were less than 0.1 wt. % and 1,400, respectively.

Synthesis of PTK Prepolymer

Second Step

A reaction mixture (Slurry $KS_2$) in the form of a slurry, which contained Prepolymer $K_2$, was obtained in the same manner as in Synthesis Experiment 1 except that the amounts of DCBP, hydrated sodium sulfide, water and NMP were changed to 121.4 kg, 51.2 kg, 20.4 kg and 532 kg, respectively (water content/NMP =5 moles/kg).

Synthesis of Copolymer

Third Step

The synthesis of a copolymer was conducted in the same manner as in Synthesis Experiment 1 except that Slurry $S_2$ was added to Slurry $KS_2$ at 180° C. to mix them, and 109 kg of water was then added to the mixture. Then, the final treatment of the reaction and collection of the resulting polymer were carried out in the same manner as in Synthesis Experiment 1, thereby obtaining Copolymer $C_2$.

The reaction conditions upon the synthesis of Copolymer $C_2$ were as follows:

(1) the molar ratio of the total amount of the charged dihalogenated aromatic compound (the sum of the amount of PDCB charged upon the synthesis of PATE Prepolymer $P_2$ and the amount of DCBP charged upon the synthesis of PTK Prepolymer $K_2$) to the total amount of the charged alkali metal sulfide (the sum of the amount of sodium sulfide charged upon the synthesis of PATE Prepolymer $P_2$ and the amount of sodium sulfide charged upon the synthesis of PTK Prepolymer $K_2$) was 0.99;

(2) the molar ratio of the amount of PDCB charged in the first step to the amount of DCBP charged in the second step was 1.6; and (3) the ratio of the water content to the charged amount of the organic amide (NMP) was 10 moles/kg.

Physical Properties of Copolymer $C_2$

The physical properties of Copolymer $C_2$ were as follows:
Melt viscosity: 320 poises
Transition temperature:
  Tg: 114° C. (as to quench-pressed sheet)
  Tm: 319° C. (as to quench-pressed sheet)
Melt crystallization temperature:
  Tmc (400° C.): 260° C.
  Tmc (400° C./10 min): 224° C.
Melt crystallization enthalpy:
  ΔHmc (400° C.): 61 J/g
Residual melt crystallization enthalpy:
  ΔHmc (400° C./10 min): 45 J/g Incidentally, the weight ratio of the sum of arylene thioether components to the sum of arylene thioether ketone components was 0.82.

The content of ketone groups in the copolymer was 7.3 wt. %.

SYNTHESIS EXPERIMENT 3:

Synthesis of Copolymer $C_3$

Synthesis of PATE Prepolymer

First Step

A reaction mixture (Slurry $S_3$) in the form of a slurry, which contained Prepolymer $P_3$, was obtained in the same manner as in Synthesis Experiment 1 except that the amounts of hydrated sodium sulfide and NMP, and PDCB, water and NMP after distilling off were changed to 210 kg and 450 kg, and 151.2 kg, 0 kg and 147 kg, respectively (PDCB/sodium sulfide =0.86 mole/mole; water content/NMP =3 moles/kg).

The amount of the remaining PDCB and the weight-average molecular weight of Prepolymer $P_3$ were determined in the same manner as in Synthesis Experiment 1 and were less than 0.1 wt. % and 2,300, respectively.

Synthesis of PTK Prepolymer

Second Step

A reaction mixture (Slurry $KS_3$) in the form of a slurry, which contained Prepolymer $K_3$, was obtained in the same manner as in Synthesis Experiment 1 except that the amounts of DCBP, hydrated sodium sulfide, water and NMP were changed to 131.7 kg, 63.2 kg, 17.9 kg and 577 kg, respectively (water content/NMP =5 moles/kg).

Synthesis of Copolymer

Third Step

The synthesis of a copolymer was conducted in the same manner as in Synthesis Experiment 1 except that Slurry $S_3$ was added to Slurry $KS_3$ at 180° C. to mix them, 127 kg of water was added to the mixture, and the reaction was conducted for 30 minutes at 265° C. Then, the final treatment of the reaction and collection of the resulting polymer were carried out in the same manner as in Synthesis Experiment 1, thereby obtaining Copolymer $C_3$.

The reaction conditions upon the synthesis of Copolymer $C_3$ were as follows:

(1) the molar ratio of the total amount of the charged dihalogenated aromatic compound (the sum of the amount of PDCB charged upon the synthesis of PATE Prepolymer $P_3$ and the amount of DCBP charged upon the synthesis of PTK Prepolymer $K_3$) to the total amount of the charged alkali metal sulfide (the sum of the amount of sodium sulfide charged upon the synthesis of PATE Prepolymer $P_3$ and the amount of sodium sulfide charged upon the synthesis of PTK Prepolymer $K_3$) was 0.99;

(2) the molar ratio of the amount of PDCB charged in the first step to the amount of DCBP charged in the second step was 2.0; and (3) the ratio of the water content to the charged amount of the organic amide (NMP) was 10 moles/kg.

Physical Properties of Copolymer $C_3$

The physical properties of Copolymer $C_3$ were as follows:
Melt viscosity: 300 poises
Transition temperature:
  Tg: 112° C. (as to quench-pressed sheet)
  Tm: 316° C. (as to quench-pressed sheet)
Melt crystallization temperature:
  Tmc (400° C.): 274° C.
  Tmc (400° C./10 min): 202° C.
Melt crystallization enthalpy:
  ΔHmc (400° C.): 50 J/g
Residual melt crystallization enthalpy:
  ΔHmc (400° C./10 min): 18 J/g Incidentally, the weight ratio of the sum of arylene thioether components to the sum of arylene thioether ketone components was 0.99.

The content of ketone groups in the copolymer was 6.6 wt. %.

Synthesis Experiment 4

Synthesis of Copolymer $C_4$

Synthesis of PATE Prepolymer

First Step

A reaction mixture (Slurry $S_4$) in the form of a slurry, which contained Prepolymer $P_4$, was obtained in the same manner as in Synthesis Experiment 1 except that the amounts of hydrated sodium sulfide and NMP, and PDCB, water and NMP after distilling off were changed to 200 kg and 440 kg, and 139.9 kg, 1 kg and 134 kg, respectively (PDCB/sodium sulfide =0.83 mole/mole; water content/NMP =3 moles/kg).

The amount of the remaining PDCB and the weight-average molecular weight of Prepolymer $P_4$ were determined in the same manner as in Synthesis Experiment 1 and were less than 0.1 wt. % and 1,750, respectively.

Synthesis of Copolymer

Second Step

In a nitrogen atmosphere, 403.6 kg of NMP, 65.2 kg of 1,4-bis(4-chlorobenzoyl)benzene (hereinafter abbreviated as "1,4-BCBB") and 58.1 kg of water were mixed with one another. The resulting mixture was added to Slurry $S_4$. After adding further 51.7 kg of water, the contents were heated to 270° C.

Thereafter, the final treatment of the reaction and collection of the resulting polymer were carried out in the same manner as in Synthesis Experiment 1, thereby obtaining Copolymer C₄.

The reaction conditions upon the synthesis of Copolymer C₄ were as follows:

(1) the molar ratio of the total amount of the charged dihalogenated aromatic compound (the sum of the amount of PDCB charged upon the synthesis of PATE Prepolymer P₄ and the amount of 1,4-BCBB charged upon the synthesis of the copolymer) to the total amount of the charged alkali metal sulfide (the amount of sodium sulfide charged upon the synthesis of PATE Prepolymer P₄) was 0.99;

(2) the molar ratio of the amount of PDCB charged in the first step to the amount of 1,4-BCBB charged in the second step was 5.2; and (3) the ratio of the water content to the charged amount of the organic amide (NMP) was 8 moles/kg.

Physical Properties of Copolymer C₄

The physical properties of Copolymer C₄ were as follows:
Melt viscosity: 500 poises
Transition temperature:
  Tg: 111° C. (as to quench-pressed sheet)
  Tm: 312° C. (as to quench-pressed sheet)
Melt crystallization temperature:
  Tmc (400° C.): 276° C.
  Tmc (400° C./10 min): 261° C.
Melt crystallization enthalpy:
  ΔHmc (400° C.): 68 J/g
Residual melt crystallization enthalpy:
  ΔHmc (400° C./10 min): 61 J/g Incidentally, the weight ratio of the sum of arylene thioether components to the sum of arylene thioether ketone components was 1.8.

The content of ketone groups in the copolymer was 6.4 wt. %.

Synthesis Experiment 5,

Synthesis of PTK

A titanium-lined reactor was charged with 90 moles of DCBP, 90 moles of hydrated sodium sulfide (water content: 53.6 wt. %) and 90 kg of NMP (water content/NMP =5 moles/kg). After the reactor being purged with nitrogen, the contents were heated from room temperature to 240° C. over 1.5 hours and maintained for 2 hours at 240° C. to react them. In order to apply the stabilization treatment in the final stage of the reaction, 4.5 moles of DCBP, 18 kg of NMP and 90 moles of water were added, and the resulting reaction mixture was reacted further for 1 hour at 240° C.

The reactor was cooled, and the reaction mixture in the form of a slurry was taken out of the reactor to pour it into about 200 liters of acetone, thereby having the resultant polymer precipitated. The polymer was collected by filtration and washed twice with acetone and additionally twice with water. Acetone and water were removed to obtain the polymer in a wet form. The wet polymer thus obtained was dried under reduced pressure for 12 hours at 100° C., thereby obtaining Polymer PTK-1 (fine powder having an average particle size of 11.5 μm).

The melting point and melt viscosity of Polymer PTK-1 (powder) were 360° C. and 560 poises (at 370° C.), respectively.

Its residual melt crystallization enthalpy, ΔHmc (400° C./10 min) and melt crystallization temperature, Tmc (400° C./10 min) were 53 J/g and 313° C., respectively.

The content of ketone groups in the copolymer was 13.2 wt. %.

EXAMPLE 1 AND COMPARATIVE EXAMPLE 1

The PATK polymers obtained in Synthesis Experiments were blended respectively with various additives at weight ratios shown in Table 1. The resulting mixture were separately charged into a single-screw extruder equipped with a nozzle 2 mm across and having a cylinder diameter of 20 mm and a cylinder length of 50 cm, and melted and kneaded at a cylinder temperature of 350° C. (at 370° C. in Example 1-5 and Comparative Example 1-5 making use of Polymer PTK-1), thereby obtaining respective strands. The strands were separately chopped to obtain pellet samples of the respective compositions.

These samples were used to determine the variations of melt viscosity with time and melt crystallization behavior. The results are shown in Table 1.

It is apparent from Table 1 that the addition of strontium carbonate has improved the melt stability at a temperature higher than that of the conventional melt processing and moreover the degree of crystallinity and crystallization speed.

On the other hand, the addition of Ca(OH)₂ can improve the melt stability significantly, but decreases Tmc (400° C.) to the considerable extent. Namely, this indicates that the crystallization speed is lowered to the considerable extent.

Magnesium carbonate, which also belongs to Group IIA in the periodic table, has very little effect. This indicates that strontium carbonate has a specific effect.

TABLE 1

|  | Kind of polymer | Stabilizer | (*1) Amount added | $\eta^*_5$ [poise] | $\eta^*_{30}/\eta^*_5$ | Melt stability Tmc(400° C./ 10 min) [°C.] | ΔHmc(400° C./ 10 min) [J/g] |
|---|---|---|---|---|---|---|---|
| Ex. 1-1 | C₁ | SrCO₃ | 0.15 | 200 | 9.5 | 237 | 49 |
| Ex. 1-2 | C₁ | SrCO₃ | 0.30 | 180 | 2.7 | 259 | 57 |
| Ex. 1-3 | C₁ | SrCO₃ | 0.50 | 190 | 2.6 | 268 | 77 |
| Comp. Ex. 1-1 | C₁ | Not added | 0 | 360 | 18.6 | 208 | 33 |
| Comp. Ex. 1-2 | C₁ | Ca(OH)₂ | 0.30 | 230 | 1.8 | 233 | 50 |
| Comp. Ex. 1-3 | C₁ | MgCO₃ | 0.30 | 280 | 16.1 |  | ND(*2) |
| Ex. 1-4 | C₄ | SrCO₃ | 0.30 | 430 | 0.9 | 281 | 70 |
| Comp. Ex. 1-4 | C₄ | Not added | 0 | 480 | 3.1 | 250 | 53 |

TABLE 1-continued

| | | | | | | |
|---|---|---|---|---|---|---|
| Ex. 1-5 | PTK-1 | SrCO3 | 0.30 | 530 | 1.7 | 318 | 51 |
| Comp. Ex. 1-5 | PTK-1 | Not added | 0 | 770 | 11.1 | 303 | 38 |

| | Melt stability | | Index of cryst. speed | | Index of crystallization | |
|---|---|---|---|---|---|---|
| | $\Delta$(Tmc) (*4) [°C.] | $\Delta$(Hmc) (*5) [J/g] | Tmc (400° C.) [°C.] | $\Delta$Tmc (*6) [°C.] | $\Delta$Hmc (400° C.) [J/g] | $\Delta$($\Delta$Hmc) (*7) [J/g] |
| Ex. 1-1 | +29 | +16 | 283 | +22 | 62 | +5 |
| Ex. 1-2 | +51 | +24 | 283 | +22 | 69 | +12 |
| Ex. 1-3 | +60 | +44 | 280 | +19 | 68 | +11 |
| Comp. Ex. 1-1 | STD(*3) | STD(*3) | 261 | STD(*3) | 57 | STD(*3) |
| Comp. Ex. 1-2 | +25 | +17 | 238 | −23 | 59 | +2 |
| Comp. Ex. 1-3 | — | — | 265 | +4 | 54 | −3 |
| Ex. 1-4 | +31 | +17 | 285 | +12 | 77 | +11 |
| Comp. Ex. 1-4 | STD(*3) | STD(*3) | 273 | STD(*3) | 66 | STD(*3) |
| Ex. 1-5 | +17 | +13 | 327 | +14 | 62 | +14 |
| Comp. Ex. 1-5 | STD(*3) | STD(*3) | 313 | STD(*3) | 48 | STD(*3) |

Note:
(*1) Parts by weight per 100 parts by weight of PATK polymer.
(*2) Not detected.
(*3) Standard value.
(*4) $\Delta$[Tmc (400° C./10 min)].
(*5) $\Delta$[$\Delta$Hmc (400° C./10 min)].
(*6) $\Delta$[Tmc (400° C.)].
(*7) $\Delta$[$\Delta$Hmc (400° C.)].

EXAMPLE 2 AND COMPARATIVE EXAMPLE 2

Illustrative Experiment of Injection Molding

Prescribed amounts of the respective PATK polymers obtained in Synthesis Experiments and PATE as the other thermoplastic resin were dry-blended with prescribed amounts of a stabilizer and a filler. The resulting blends were separately charged into a single-screw extruder having a cylinder diameter of 19 mm and an L/D ratio of 25, melted and kneaded at a cylinder temperature of 350° C., extruded into strands, quenched and chopped, thereby obtaining pellet samples of the respective compositions. Incidentally, in Example 2-7 and Comparative Example 2—2, the melting and kneading were conducted at a cylinder temperature of 370° C. to prepare pellet samples.

These pellet samples were separately charged in an injection molding machine and then injection-molded under molding conditions of a cylinder temperature of 350° C. and a mold temperature of 180° C., thereby obtaining injection-molded products.

The SrCO3-added pellets showed good long-run property.

The proportions of the components in the respective compositions and the physical properties of the injection-molded products are as shown in Table 2. It has been found that the strength, modulus, heat resistance (heat distortion temperature and solder heat resistance), etc. are improved by the incorporation of a fibrous filler. In addition, the addition of SrCO3 as a stabilizer can improve the melt stability.

TABLE 2

| | | Example | | | | | | | | Comp. Ex. | |
|---|---|---|---|---|---|---|---|---|---|---|---|
| | | 2-1 | 2-2 | 2-3 | 2-4 | 2-5 | 2-6 | 2-7 | 2-8 | 2-1 | 2-2 |
| PATK polymer | Kind 1 | C1 | C2 | C2 | C3 | C4 | C2 | C1 | — | — | — |
| | Parts by weight | 60 | 60 | 60 | 60 | 60 | 30 | 50 | — | — | — |
| | Kind 2 | — | — | — | — | — | PTK-1 | — | PTK-1 | — | PTK-1 |
| | Parts by weight | — | — | — | — | — | 13.5 | — | 60 | — | 60 |
| Stabilizer | Kind | SrCO3 | SrCO3 | SrCO3 | SrCO3 | SrCO3 | SrCO3 | SrCO3 | SrCO3 | — | — |
| | Parts by weight | 0.15 | 0.30 | 0.15 | 0.15 | 0.15 | 0.15 | 0.15 | 0.15 | — | — |
| Other thermoplastic resin | Kind | — | — | — | — | — | PATE | PATE | — | PATE | — |
| | Parts by weight | — | — | — | — | — | 16.5 | 10 | — | 60 | — |
| Fibrous Filler | Kind | (*1) | (*1) | (*1) | (*1) | (*1) | (*1) | (*1) | (*1) | (*1) | (*1) |
| | Parts by weight | 40 | 40 | 40 | 40 | 40 | 40 | 40 | 40 | 40 | 40 |
| Flexural strength ASTM D790 (23° C.) kg/mm² | | 25 | 27 | 26 | 27 | 26 | 27 | 26 | 24 | 26 | 20 |
| Flexural modulus ASTM D790 (23° C.) kg/mm² | | 1550 | 1500 | 1550 | 1600 | 1500 | 1500 | 1500 | 1550 | 1500 | 1600 |
| Heat distortion temperature ASTM D648 [18.6 kg/mm²] (°C.) | | 300 | 295 | 295 | 290 | 300 | 295 | 285 | 345 | 275 | 345 |
| Solder heat resistance (°C.) | | >285 | >285 | >285 | >285 | >285 | >285 | >280 | >285 | <260 | >285 |
| Melt stability (370° C.) $\eta^*_{30}/\eta^*_5$ | | 5.8 | 1.0 | 3.1 | 3.7 | 0.7 | 1.6 | 3.1 | 3.0 | 0.4 | >10 |

(*1) Glass fibers (product of Nippon Electric Glass Co., Ltd.; 10 μm across, 3 mm long).
PATE: Poly(p-phenylene thioether); "FORTRON #W214" (trade mark; product of Kureha Chemical Industry Co., Ltd.).

What is claimed is:

1. A resin composition of high heat resistance, comprising 100 parts by weight of at least one arylene thioether ketone polymer and a stabilizer consisting essentially of 0.05-30 parts by weight of strontium carbonate.

2. The resin composition according to claim 1, wherein the arylene thioether ketone polymer is a copolymer alternately comprising at least one poly(arylene thioether-ketone) component (X) having predominant recurring units of the formula:

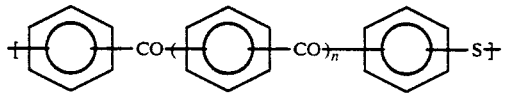

wherein n stands for 0 or 1, and at least one poly(arylene thioether) component (Y) having predominant recurring units of the formula:

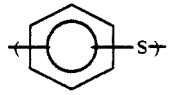

and having the following features:
(a) the weight ratio of the total amount of the components (Y) to the total amount of the components (X) being within a range of 0.05-9;
(b) the weight-average molecular weight of the component (Y) being at least 200; and
(c) the melt viscosity of the copolymer being 2-100,000 poises as determined by viscosity measurement at 370° C. and a shear rate of 1,200/sec.

3. The resin composition according to claim 2, wherein the copolymer is composed of the poly(arylene thioether-ketone) component (X) having at least one predominant recurring units selected from the group consisting of:

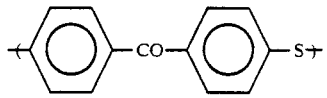

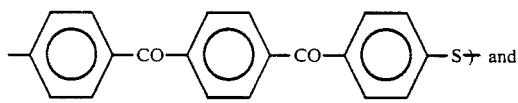

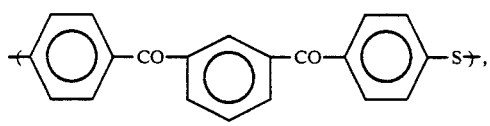

and the poly(arylene thioether) component (Y) having predominant recurring units of the formula:

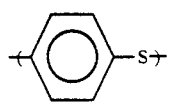

4. The resin composition according to claim 1, wherein the arylene thioether ketone polymer is a poly(arylene thioether ketone) having predominant recurring units of the formula:

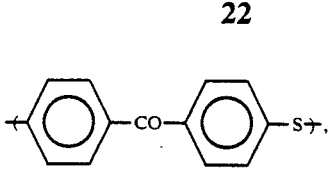

wherein the —CO— and —S— are in the para position to each other.

5. The resin composition according to claim 1, wherein the composition has a ratio $\eta^*_{30}/\eta^*_5$ of 0.5-15, i which $\eta^*_5$ is a melt viscosity of the composition as measured at a shear rate of 1,200/sec after the composition is held at 370° C. for 5 minutes and $\eta^*_{30}$ is a melt viscosity of the composition as measured at a shear rate of 1,200/sec after the composition is held at 370° C. for 30 minutes.

6. The resin composition according to claim 1, wherein the degree of increase in melt crystallization temperature, Δ, which is expressed in terms of a difference between the melt crystallization temperature, Tmc (400° C.) of the resin composition comprising strontium carbonate and at least one arylene thioether ketone polymer and that of any resin composition containing no strontium carbonate and comprising at least one arylene thioether ketone polymer, is at least 5° C., wherein Tmc (400° C.) is determined by a differential scanning calorimeter at a cooling rate of 10° C./min immediately after the respective resin compositions are heated to 400° C. in an inert gas atmosphere.

7. The resin composition according to claim 2, wherein the composition has a ratio $\eta^*_{30}/\eta^*_5$ of 0.5-15, in which $\eta^*_5$ is a melt viscosity of the composition as measured at a shear rate of 1,200/sec after the composition is held at 370° C. for 5 minutes and $\eta^*_{30}$ is a melt viscosity of the composition as measured at a shear rate of 1,200/sec after the composition is held at 370° C. for 30 minutes.

8. The resin composition according to claim 3, wherein the composition has a ratio $\eta^*_{30}/\eta^*_5$ of 0.5-15, in which $\eta^*_5$ is a melt viscosity of the composition as measured at a shear rate of 1,200/sec after the composition is held at 370° C. for 5 minutes and $\eta^*_{30}$ is a melt viscosity of the composition as measured at a shear rate of 1,200/sec after the composition is held at 370° C. for 30 minutes.

9. The resin composition according to claim 4, wherein the composition has a ratio $\eta^*_{30}/\eta^*_5$ of 0.5-15, in which $\eta^*_5$ is a melt viscosity of the composition as measured at a shear rate of 1,200/sec after the composition is held at 370° C. for 5 minutes and $\eta^*_{30}$ is a melt viscosity of the composition as measured at a shear rate of 1,200/sec after the composition is held at 370° C. for 30 minutes.

10. The resin composition according to claim 2, wherein the degree of increase in melt crystallization temperature, Δ, which is expressed in terms of a difference between the melt crystallization temperature, Tmc (400° C.) of the resin composition comprising strontium carbonate and at least one arylene thioether ketone polymer and that of any resin composition containing no strontium carbonate and comprising at least one arylene thioether ketone polymer, is at least 5° C., wherein Tmc (400° C.) is determined by a differential scanning calorimeter at a cooling rate of 10° C./min immediately after the respective resin compositions are heated to 400 C. in an inert gas atmosphere.

11. The resin composition according to claim 3, wherein the degree of increase in melt crystallization temperature, Δ, which is expressed in terms of a difference between the melt crystallization temperature, Tmc (400° C.) of the resin composition comprising strontium carbonate and at least one arylene thioether ketone polymer and that of any resin composition containing no strontium carbonate and comprising at least one arylene thioether ketone polymer, is at least 50° C., wherein Tmc (400° C.) is determined by a differential scanning calorimeter at a cooling rate of 10° C./min immediately after the respective resin compositions are heated to 400 C. in an inert gas atmosphere.

12. The resin composition according to claim 4, wherein the degree of increase in melt crystallization temperature, Δ, which is expressed in terms of a difference between the melt crystallization temperature, Tmc (400° C.) of the resin composition containing strontium carbonate and at least one arylene thioether ketone polymer and that of any resin composition containing no strontium carbonate and comprising at least one arylene thioether ketone polymer, is at least 50° C., wherein Tmc (400° C.) is determined by a differential scanning calorimeter at a cooling rate of 10° C./min immediately after the respective resin compositions are heated to 400 C. in an inert gas atmosphere.

13. A method of improving the melt stability and degree of crystallinity of a resin composition comprising 100 parts by weight of at least one arylene thioether ketone polymer, said method comprising adding a stabilizer consisting essentially of 0.05-30 parts by weight of strontium carbonate.

14. The method according to claim 13, wherein the arylene thioether ketone polymer is a copolymer alternately comprising at least one poly(arylene thioether-ketone) component (X) having predominant recurring units of the formula:

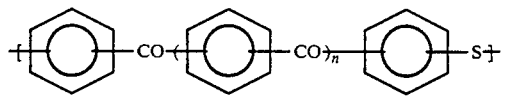

wherein n stands for 0 or 1, and at least one poly(arylene thioether) component (Y) having predominant recurring units of the formula:

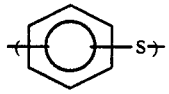

and having the following features:
(a) the weight ratio of the total amount of the components (Y) to the total amount of the components (X) being within a range of 0.05-9;
(b) the weight-average molecular weight of the component (Y) being at least 200; and
(c) the melt viscosity of the copolymer being 2-100,000 poises as determined by viscosity measurement at 370° C. and a shear rate of 1,200/sec.

15. The method according to claim 14, wherein the copolymer is composed of the poly(arylene thioether-ketone) component (X) having at least one predominant recurring units selected from the group consisting of:

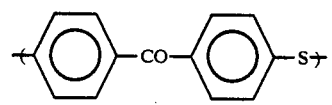

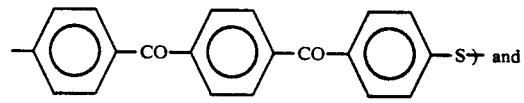

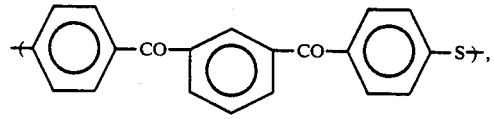

and the poly(arylene thioether) component (Y) having predominant recurring units of the formula:

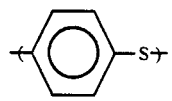

16. The method according to claim 13, wherein the arylene thioether ketone polymer is a poly(arylene thioether ketone) having predominant recurring units of the formula:

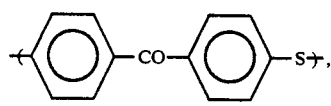

wherein the —CO— and —S— are in the para position to each other.

* * * * *